United States Patent
Jeong et al.

(10) Patent No.: US 10,128,663 B2
(45) Date of Patent: Nov. 13, 2018

(54) WIRELESS POWER TRANSFER USING STACKED RESONATORS

(71) Applicant: QUALCOMM Incorporated, San Diego, CA (US)

(72) Inventors: Seong Heon Jeong, San Diego, CA (US); Francesco Carobolante, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 819 days.

(21) Appl. No.: 14/528,634

(22) Filed: Oct. 30, 2014

(65) Prior Publication Data
US 2016/0126744 A1    May 5, 2016

(51) Int. Cl.
H02J 5/00       (2016.01)
H01F 38/14     (2006.01)
H02J 7/02       (2016.01)
H02J 17/00     (2006.01)

(52) U.S. Cl.
CPC ............. *H02J 5/005* (2013.01); *H01F 38/14* (2013.01); *H02J 7/025* (2013.01); *H02J 17/00* (2013.01)

(58) Field of Classification Search
CPC .................................................. H02J 5/005
USPC ........................................................ 307/104
See application file for complete search history.

(56) References Cited

U.S. PATENT DOCUMENTS

| | | | |
|---|---|---|---|
| 8,957,549 B2* | 2/2015 | Kesler | H03H 7/40 307/104 |
| 2008/0278275 A1 | 11/2008 | Fouquet et al. | |
| 2009/0153273 A1 | 6/2009 | Chen et al. | |
| 2009/0286470 A1 | 11/2009 | Mohammadian et al. | |
| 2012/0161696 A1 | 6/2012 | Cook et al. | |
| 2014/0008974 A1 | 1/2014 | Miyamoto | |
| 2014/0028112 A1 | 1/2014 | Hui et al. | |
| 2014/0125275 A1 | 5/2014 | Low et al. | |
| 2015/0008767 A1 | 1/2015 | Shinoda et al. | |

FOREIGN PATENT DOCUMENTS

| | | |
|---|---|---|
| GB | 2389720 A | 12/2003 |
| WO | 2004038888 A2 | 5/2004 |
| WO | 2012150293 A1 | 11/2012 |
| WO | 2013145019 A1 | 10/2013 |

OTHER PUBLICATIONS

Second Written Opinion from International Application No. PCT/US2015/055152 dated Oct. 7, 016, 8 pgs.
(Continued)

*Primary Examiner* — Joseph Chang
(74) *Attorney, Agent, or Firm* — Hunter Clark PLLC

(57) ABSTRACT

A wireless power transfer system may include a primary resonator and one or more secondary resonators. At least one of the secondary resonators lie in overlapping relation to the primary resonator. An electromagnetic (EM) field generated by the primary resonator can couple to the secondary resonators, thus inducing current flow in the secondary resonators. EM fields generated by the secondary resonators interact with the EM field from the primary resonator to produce a resultant EM field.

27 Claims, 12 Drawing Sheets

(56) References Cited

OTHER PUBLICATIONS

Wong E., "A Review on Technologies for Wireless Electricity," HKPC, Mar. 27, 2013, slides 1 to slides 22.
Zhong W., et al., "General Analysis on the Use of Tesla's Resonators in Domino Forms for Wireless Power Transfer," IEEE Transactions on Industrial Electronics, Jan. 2013, vol. 60 (1), pp. 261-270, < URL: http://hdl.handle.net/10722/181666 >.
International Search Report and Written Opinion—PCT/US2015/055152—ISA/EPO—Jan. 28, 2016—11 pgs.
International Preliminary Report on Patentability—PCT/US2015/055152, The International Bureau of WIPO—Geneva, Switzerland, dated Feb. 28, 2017.

* cited by examiner

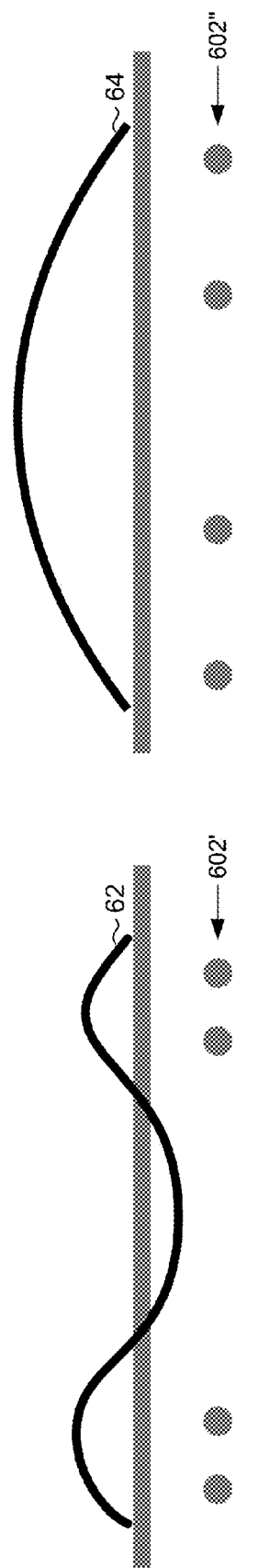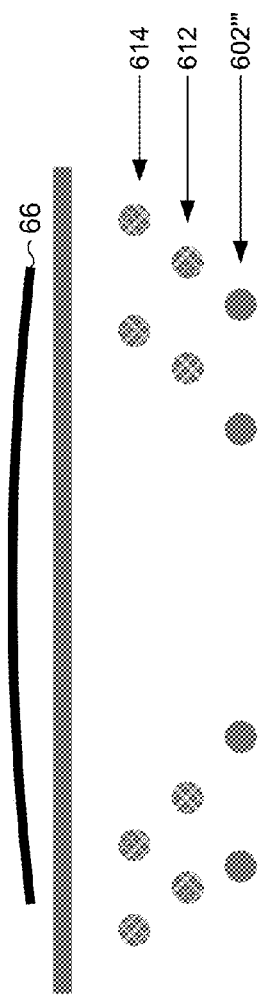

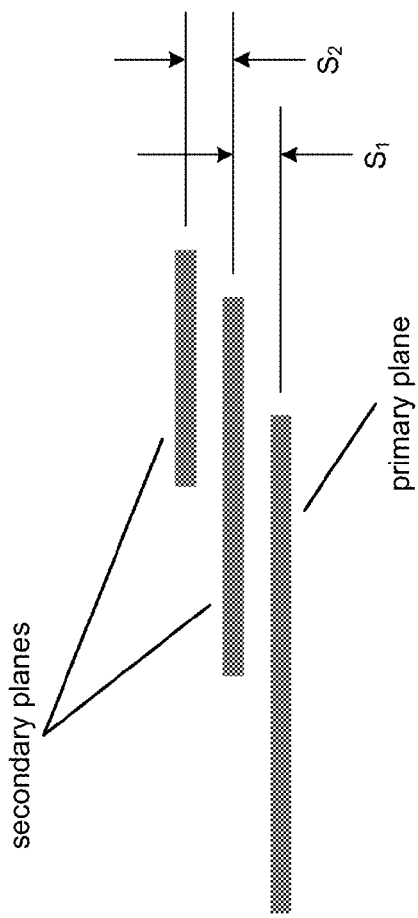
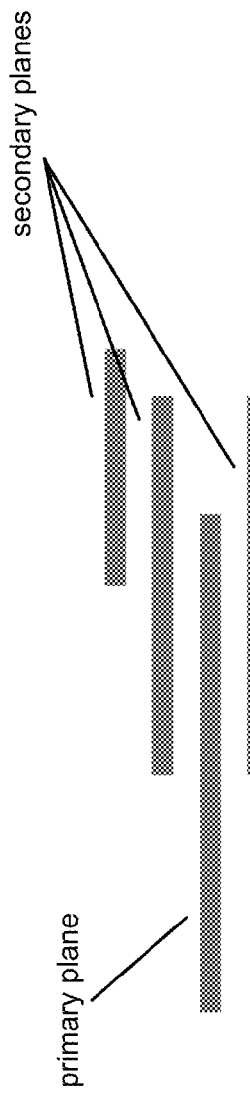

WIRELESS POWER TRANSFER USING STACKED RESONATORS

TECHNICAL FIELD

The present disclosure generally relates to wireless power. More specifically, the disclosure is directed to devices, systems, and methods related to wireless power transfer using stacked resonators.

BACKGROUND

Wireless power transfer is a growing technology, and has application in many electronic devices and systems. In addition, even non-electronic objects can be configured with wireless power capability. For example, a wall or ceiling in a house can be equipped with a coil in order to provide power to light fixtures, consumer electronics such as a television, desktop computers, a computer monitor, and so on.

Wireless power transfer refers to the transmission of electrical energy from a power source (e.g., power transmission unit, PTU) to an electrical load (e.g., power receiving unit, PRU) without a hard-wired connection between the PTU and PRU. A common technique is called resonant inductive coupling, in which wireless transmission of electrical energy is achieved between closely spaced coils ("resonators") that are tuned to resonate at the same frequency. A coil (transmit coil) in the PTU may be driven by a time-varying signal to generate an electromagnetic (EM) field. The magnetic field will inductively couple to a nearby coil (receiver coil) in an electronic device (PRU) such as a smartphone, a computer tablet, etc. A flow of current is induced in the receiver coil, which can then be used to charge a battery in the PRU or provide power to the PRU.

Different electrical devices, however, may require a specific resonator design to account for size, height, induced voltage range, impedance range, and so on in order to provide efficient power delivery. Other design considerations include electromagnetic interference (EMI) effects. Manufacturers may have to consider operating and safety regulations, which set limits on the effects of EMI on nearby electronic devices, specific absorption rate (SAR) for humans, and so on. These considerations tend to impose constraints on the design of the resonators in a PTU.

SUMMARY

A wireless charging system in accordance with aspects of the present disclosure may include a primary resonator and at least one secondary resonator. The secondary resonator may extend over at least a portion of the primary resonator. The secondary resonator may generate a secondary magnetic field in response to coupling with a primary magnetic field generated by the primary resonator. A resultant magnetic field may arise from interactions between the primary and secondary magnetic fields.

In some aspects, the secondary resonator extends over at most a portion of the primary resonator. In other aspects, at most a portion of the secondary resonator extends over the primary resonator.

In some aspects, the wireless charging system may further include a tertiary resonator. The tertiary resonator may have no portion that extends over the primary resonator. In other aspects, no portion of the tertiary resonator extends over the secondary resonator. In still other aspects, a portion of the tertiary resonator extends over a portion of the secondary resonator. In yet other aspects, tertiary resonator may extend over at least a portion of the primary resonator and the secondary resonator.

In some aspects, the secondary resonator may include a capacitive element to configure the secondary resonator to have approximately the same resonant frequency as the primary resonator.

In accordance with other aspects of the present disclosure, a wireless charging system may include a primary loop of conductive material and several secondary loops of conductive material. At least a portion of each secondary loop may be in overlapping relation with the primary loop. The secondary loops may couple with a magnetic field generated by the primary loop when said primary loop is driven by a time varying signal, and consequently generate a resultant EM field that includes modifying the magnetic field generated by the primary resonator.

In accordance with other aspects of the present disclosure, a wireless charging system may include a transmit coil and several parasitic coils. At least one of the parasitic coils may be in overlapping relation with the transmit coil, wherein a primary magnetic field generated from the transmit coil may couple to the parasitic coils, and thus generate respective secondary magnetic fields which interact with the primary magnetic field to produce a resultant magnetic field for transferring power to a receiver device.

In accordance with aspects of the present disclosure, a wireless charging apparatus may include means for coupling with a primary magnetic field generated by a primary resonator. The means for coupling may be configured to generate a secondary magnetic field as a result of being coupled with the primary magnetic field. The means for coupling may be coextensive with the primary resonator such that interaction between the primary magnetic field and the secondary magnetic field can produce a resultant magnetic field having a field distribution different from the primary magnetic field. The apparatus may further include means for supporting the means for coupling relative to the primary magnetic field.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings:

FIGS. 6A, 6B, and 6C illustrate an aspect of the present disclosure that relates to field distribution.

FIGS. 10A and 10B illustrate examples of stacking in accordance with the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

Figure 1:
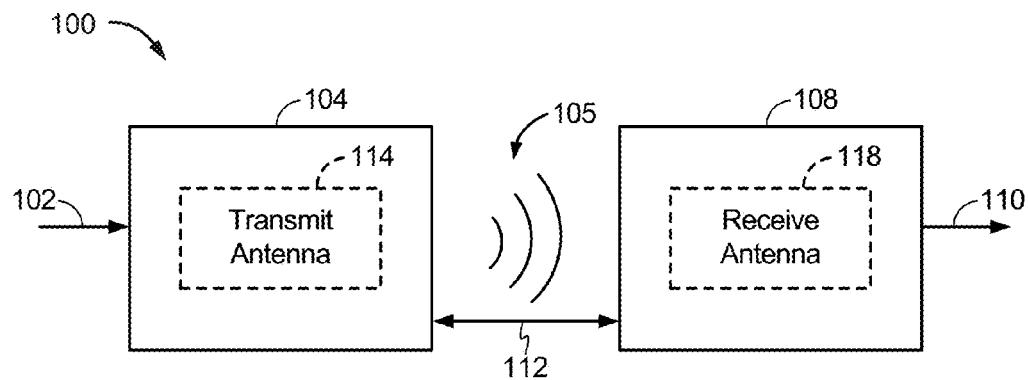
FIG. 1 is a functional block diagram of a wireless power transfer system, in accordance with the present disclosure.

FIG. 1 is a functional block diagram of a wireless power transfer system 100 in accordance with the present disclosure. An input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate an output power 110 for storing or consumption by a device (not shown in this figure) coupled to the output power 110. Both the transmitter 104 and the receiver 108 may be separated by a distance 112.

In some embodiments, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 can be minimal. As such, wireless power transfer may be provided over a larger distance in contrast to purely inductive solutions that may involve large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may develop between the transmit coil 114 and the receive coil 118. The area around the transmit antenna 114 and the receive antenna 118 where this coupling may occur is referred to herein as a coupling mode region.

Figure 2:
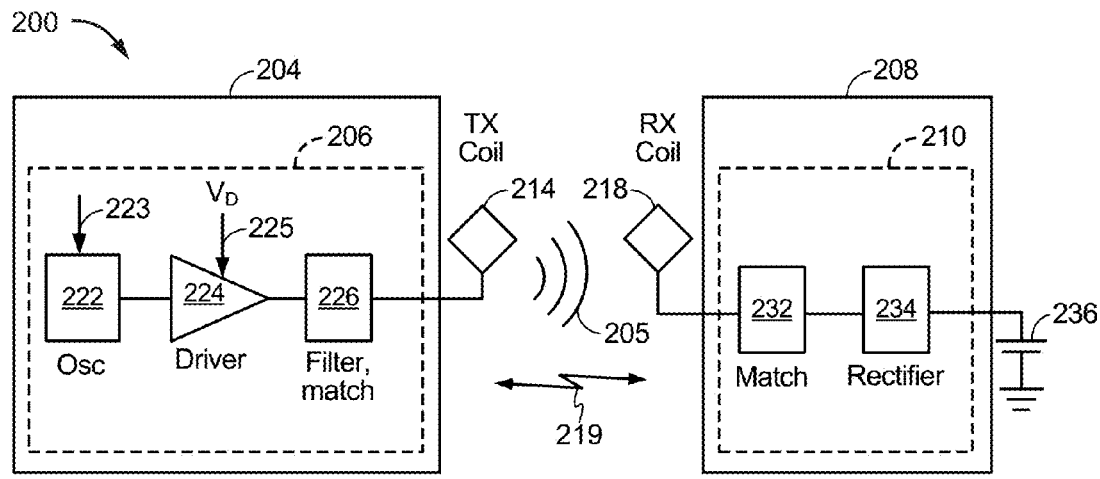
FIG. 2 is a functional block diagram of a wireless power transfer system, in accordance with the present disclosure.

FIG. 2 is a functional block diagram of a wireless power transfer system 200 in accordance with some embodiments. The system 200 includes a transmitter 204 and a receiver 208. The transmitter 204 (also referred to herein as a power transferring unit, PTU) may include transmit circuitry 206 that may include an oscillator 222, a driver circuit 224, and a filter and matching circuit 226. The oscillator 222 may be configured to generate an oscillator signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave.

The filter and matching circuit 226 may filter out harmonics or other unwanted frequencies and match the impedance of the transmitter 204 to the transmit antenna 214. As a result of driving the transmit antenna 14, the transmit antenna 214 may generate a wireless field 205 to wirelessly output power at a level sufficient for charging a battery 236.

The receiver 208 (also referred to herein as a power receiving unit, PRU) may include receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternating current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

As discussed above, both transmitter 204 and receiver 208 may be separated by a distance and may be configured according to a mutual resonant relationship to minimize transmission losses between the transmitter 204 and the receiver 208. When the transmit antenna 214 and the receive antenna 218 are mutually resonant and in close proximity, the wireless power transfer system 200 may be described as a strongly coupled regime where the coupling coefficient (coupling coefficient k) is typically above 0.3. In some embodiments, the coupling coefficient k between the transmitter 204 and receiver 208 may vary based on at least one of the distance between the two corresponding antennas or the size of the corresponding antennas, etc.

Figure 3:
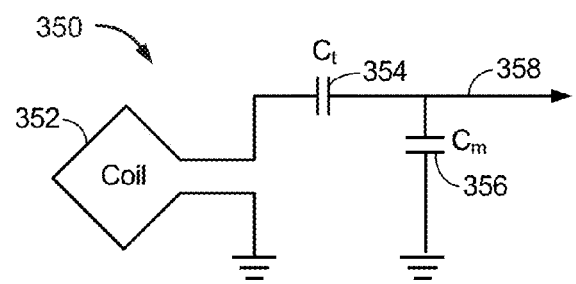
FIG. 3 is a schematic diagram of a portion of transmit circuitry or receive circuitry of FIG. 2 including a transmit or receive antenna, in accordance with present disclosure.

FIG. 3 is a schematic diagram of a portion of the transmit circuitry 206 or the receive circuitry 210 of FIG. 2 in accordance with some embodiments. As illustrated in FIG. 3, transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power. The antenna 352 may include an air core or a physical core such as a ferrite core (not shown in this figure).

As stated, efficient transfer of energy between the transmitter 104 (transmitter 204 as referenced in FIG. 2) and the receiver 108 (receiver 208 as referenced in FIG. 2) may occur during matched or nearly matched resonance between the transmitter 104 and the receiver 108. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 (wireless field 205 as referenced in FIG. 2) of the transmit coil 114 (transmit coil 214 as referenced in FIG. 2) to the receive coil 118 (receive coil 218 as referenced in FIG. 2), residing in the vicinity of the wireless field 105, rather than propagating the energy from the transmit coil 114 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near field may increase. Other resonant circuits formed using other components are also possible. As another non limiting example, a capacitor may be placed in parallel between the two terminals of the circuitry 350. For transmit antennas, the signal 358, with a frequency that substantially corresponds to the resonant frequency of the antenna 352, may be an input to the antenna 352.

In FIG. 1, the transmitter 104 (referred to hereinafter as a power transfer unit, PTU) may output a time varying magnetic (or electromagnetic) field with a frequency corresponding to the resonant frequency of the transmit coil 114. When the receiver 108 (referred to hereinafter as a power receiving unit, PRU) is within the wireless field 105, the time varying magnetic (or electromagnetic) field may induce a current in the receive coil 118. As described above, if the receive coil 118 is configured to resonate at the frequency of the transmit coil 114, energy may be efficiently transferred. The AC signal induced in the receive coil 118 may be rectified as described above to produce a DC signal that may be provided to charge or to power a load.

Figure 4B:
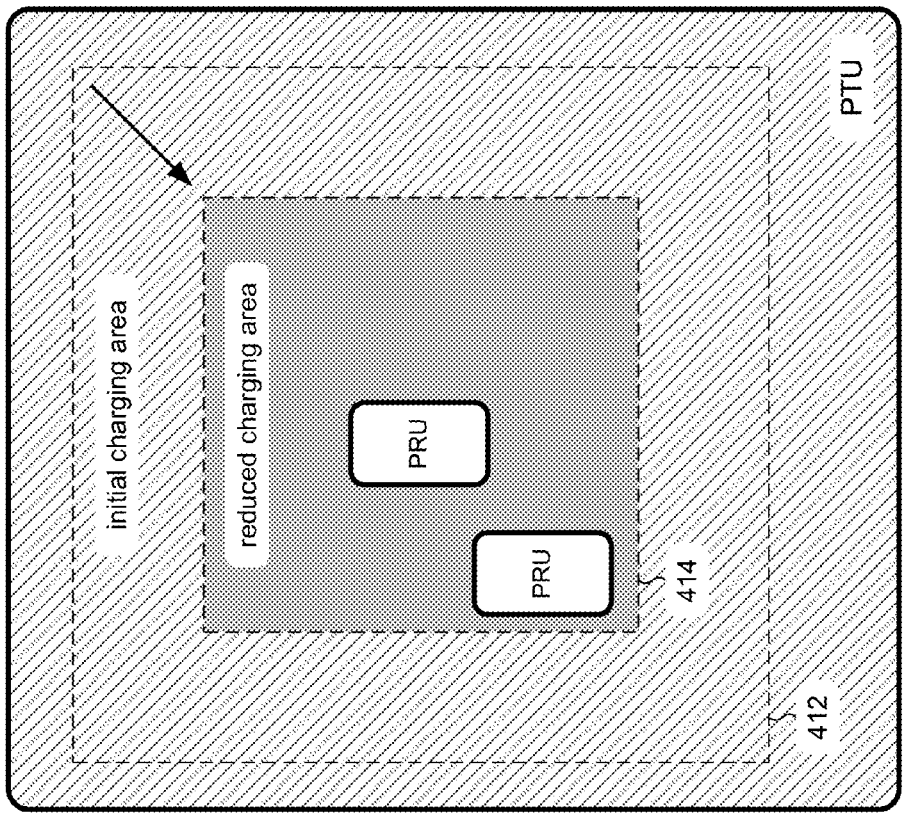
FIGS. 4A and 4B illustrate an aspect of the present disclosure that relates to charging area.
Figure 4A:
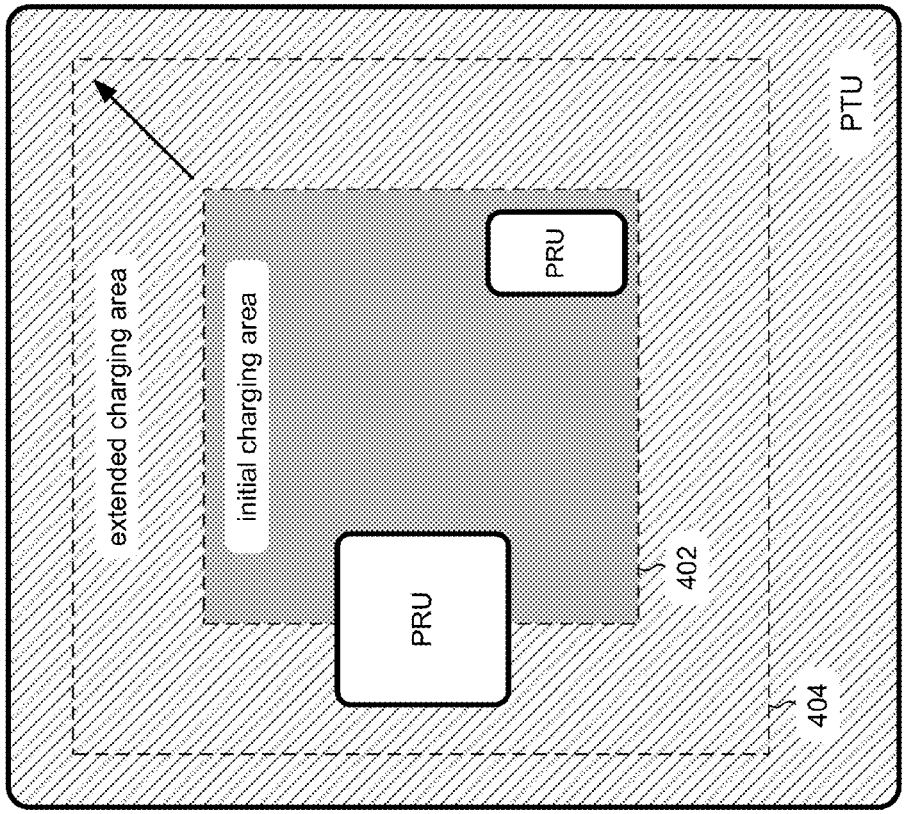

Referring to FIG. 4A, the extent of an initial charging area 402 generated by a PTU (e.g., transmit antenna 214, FIG. 2) can be extended to provide an extended charging area 404 for additional or larger PRUs. A user may want to extend their charging area, for example, in order to provide wireless charging for additional electronic devices. Alternatively, the user may want to provide wireless charging for a larger electronic device. Conversely, as illustrated in FIG. 4B, the extent of an initial charging area 412 may be reduced in size. From a user point of view, a reduced charging area 414 may be desirable to reduce power consumption and/or EMI emissions. From a performance point of view, the reduced charging area 414 can provide less impedance variations across the charging area as compared a larger charging area, and may provide higher mutual coupling.

Figure 5A:
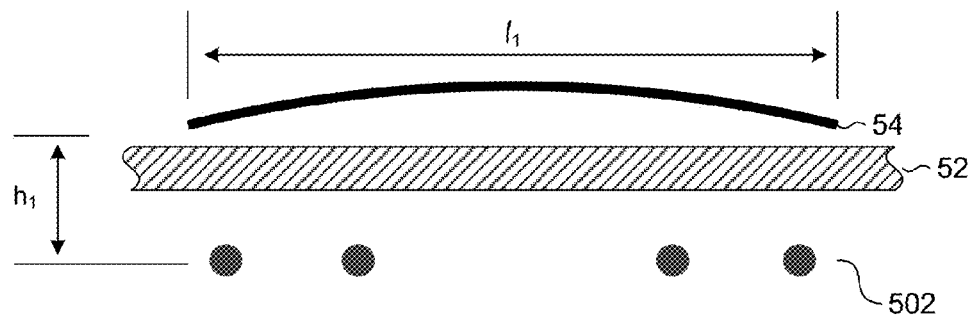
FIGS. 5A, 5B, and 5C illustrate an aspect of the present disclosure that relates to field height.
Figure 5B:
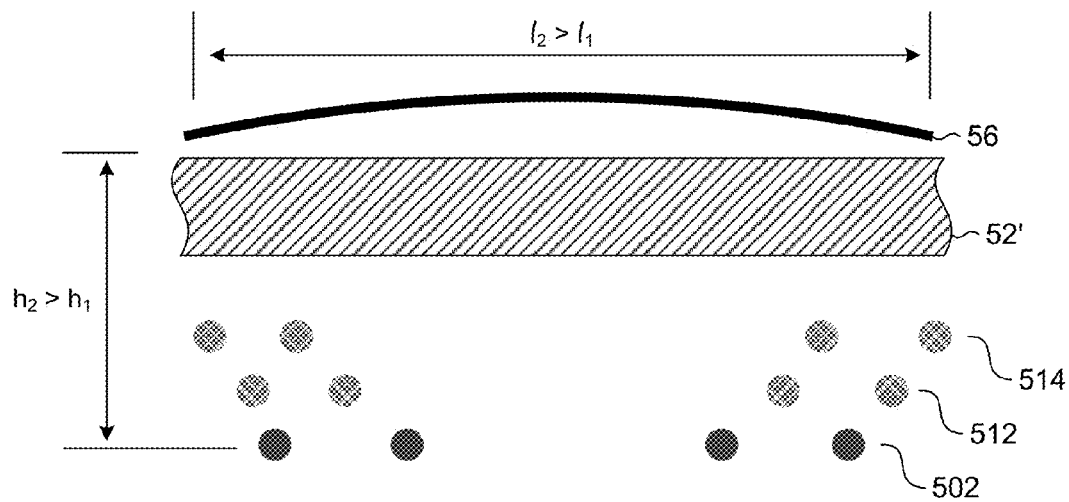
Figure 5C:
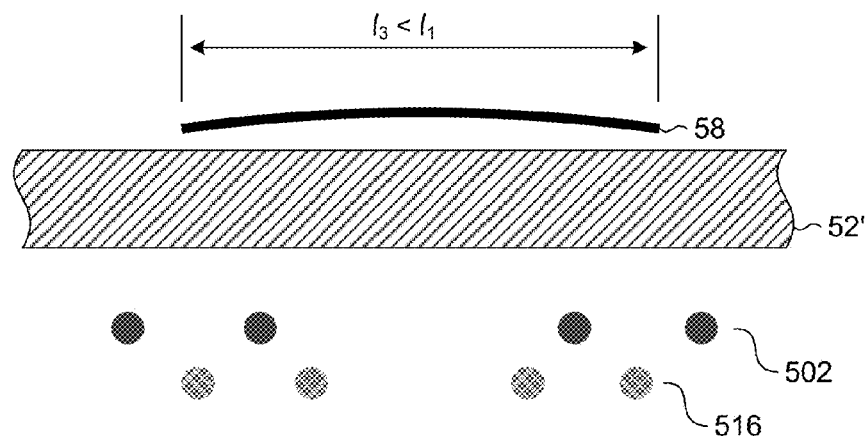

FIGS. 5A, 5B, and 5C illustrate further aspects of embodiments in accordance with the present disclosure. FIG. 5A depicts, in cross section, the resonator 502 of a wireless charging system, which may comprise a coil of conductive material having one or more windings. The resonator 502 may be positioned beneath a charging surface; e.g., of a table top 52. It is noted that dimensions are not shown to scale, and that proportions may be exaggerated for illustration. In operation, the resonator 502 may be connected to a suitable power source (not shown) to produce a magnetic field 54. FIG. 5A depicts that a useful intensity of the magnetic field 54 extends to a height h1 and spans a width l1 according to certain embodiments.

In accordance with the present disclosure, the height of the magnetic field 54 may be increased by adapting the wireless charging system with additional resonators. FIG. 5B depicts an embodiment in which the magnetic field generated by resonator 502 (referred to herein as a "primary" resonator) can be enhanced with additional secondary resonators 512, 514; e.g., for example, to accommodate a thicker table top 52'. FIG. 5B, for example, shows that the height of the useful intensity of magnetic field 56 resulting from the combined effect of primary resonator 502 and secondary resonators 512, 514 may be increased in order to reach the charging surface of the larger table top 52'. FIG. 5B further illustrates that a lateral span of the magnetic field 56 may be increased from l1 to l2, thereby increasing the charging area.

FIG. 5C depicts another embodiment in which the magnetic field generated by primary resonator 502 can be enhanced with an additional secondary resonator 516. In the illustrative example shown in FIG. 5C, the magnetic field 58 generated by resonators 502 and 516 has a reduce span (l3<l1) as compared to the magnetic field 54 generated from the primary resonator alone.

FIGS. 6A, 6B, and 6C illustrate still further aspects of embodiments in accordance with the present disclosure. FIG. 6A shows an exaggerated distribution of a magnetic field 62, illustrating that the magnetic field produced by a primary resonator 602' may be non-uniform; i.e., there are large variations of the intensity of magnetic field across the field. FIG. 6B illustrates another example of a primary resonator 602" that can produce a magnetic field 64 having a non-uniform distribution. FIG. 6C illustrates that a properly configured and aligned stack of secondary resonators 612, 614 in conjunction with a primary resonator 602''' can reduce the non-uniformity to generate a magnetic field 66 having a more uniform distribution than the primary resonator alone.

It can be appreciated from the foregoing that the magnetic field in a wireless charging system can be manipulated by varying the relative arrangement and stacking arrangement of the resonators comprising the wireless charging system. Aspects of the magnetic field can be controlled such as charging area, magnetic field strength, field uniformity, and so on. The following discussion will address details of illustrative embodiments in accordance with the present disclosure.

Figure 7:
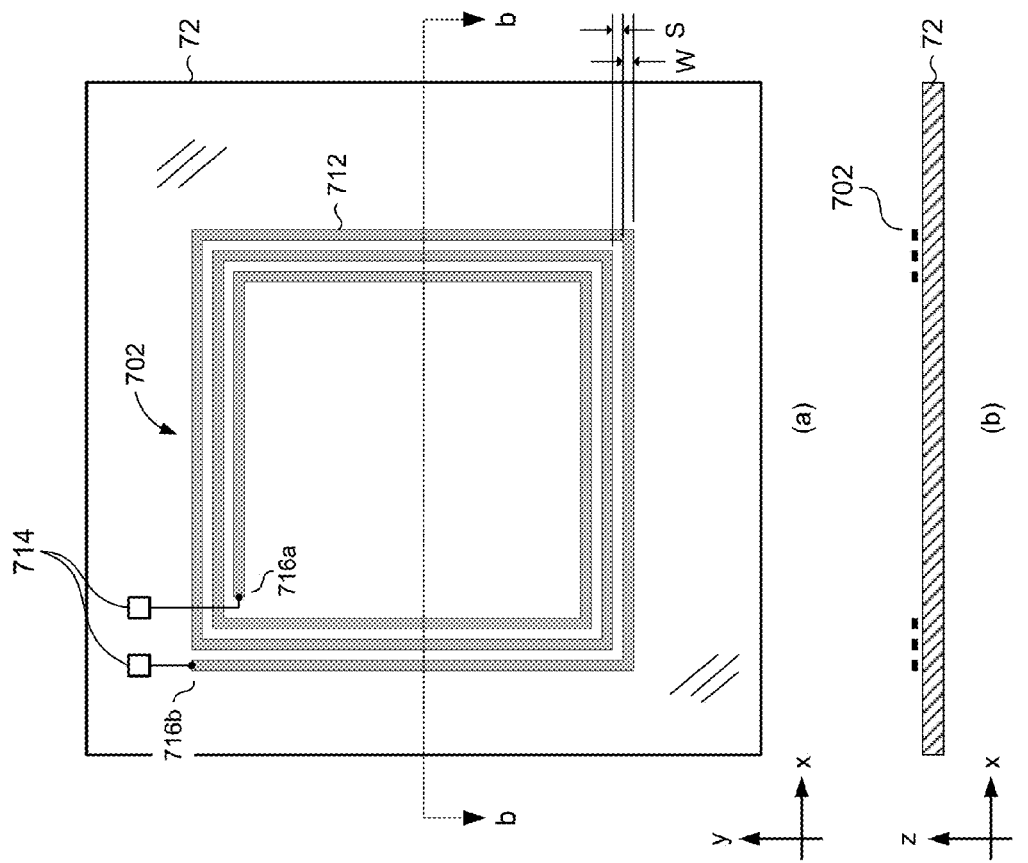
FIG. 7 illustrates an embodiment of a resonator in accordance with the present disclosure.

Referring to FIG. 7, a primary resonator 702 may be formed, disposed, or otherwise supported on the surface of a suitable substrate 72. In some embodiments, the substrate 72 may be a printed circuit board (PCB), and the surface may be generally planar. The primary resonator 702 may comprise a coil 712 (transmit coil) that can be wound into any suitable number of turns. FIG. 7, for example, shows the primary resonator 702 comprising a coil 712 of three turns. The material for coil 712 may be any suitable electrically conductive material, and may be disposed on the substrate 72 using any suitable fabrication process. FIG. 7 also depicts a cross-sectional view (b) of the primary resonator 702 and substrate 72 taken along view line b-b. As a matter of convention, a height or vertical direction will be taken along the Z-axis, lateral directions (e.g., width, length) will be taken along the X- and Y-axes.

The primary resonator 702 is designated as "primary" because it receives power (e.g., an AC current) for generating an EM field. In some embodiments, the primary resonator 702 may include terminals 714 for a connection to a power source (not shown). In some embodiments, the terminals 714 may be disposed on the major surface of substrate 72 that is opposite the surface on which the coil 712 is disposed. Vias (not shown) may be formed through the substrate 72 to provide an electrical connection between the ends 716a, 716b of the primary resonator 702 disposed on one major surface of substrate 72 and the terminals 714 disposed on the opposing major surface of substrate 72.

The following dimensions are provided merely to give a sense of the scale of the resonators. The primary resonator may have the following dimensions in some embodiments. For example, the spacing S between turns in the coil 712 in some embodiments may be 2 mm. The trace width W of the coil may be 2 mm. The area of the coil 712 may be 90×90 mm$^2$. It will be appreciated of course that these dimensions are purely illustrative, and that in other embodiments according to the present disclosure, other dimensions are possible.

Figure 8A:
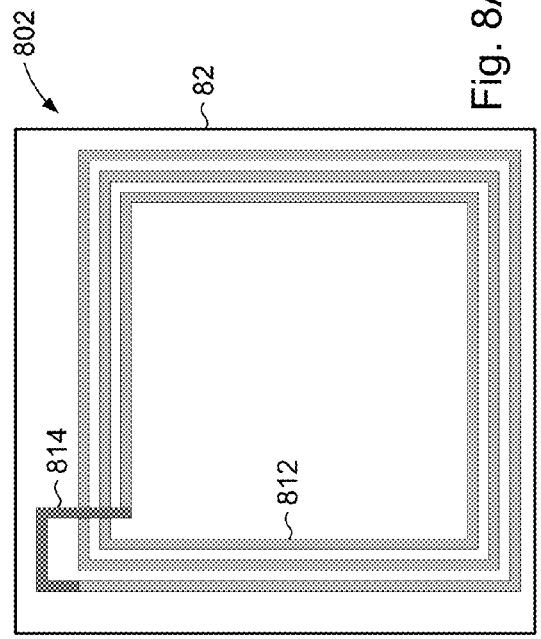
FIGS. 8A and 8B illustrate embodiments of resonators in accordance with the present disclosure.
Figure 8B:
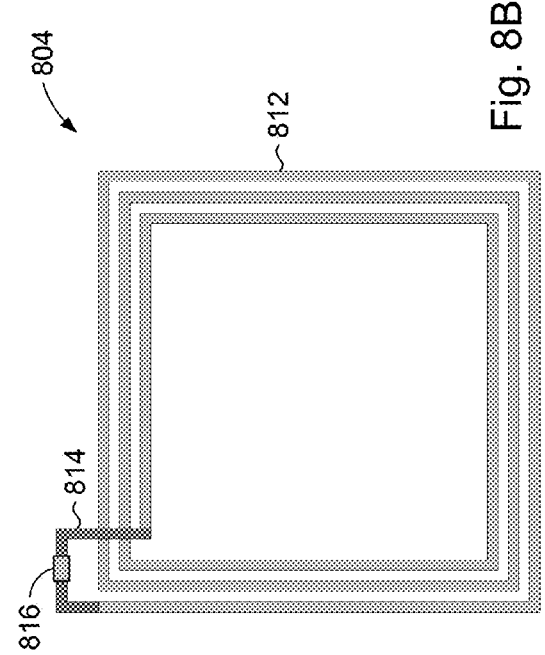

Illustrative embodiments of secondary resonators in accordance with the present disclosure are shown in FIGS. 8A and 8B. FIG. 8A shows a secondary resonator 802 comprising a coil 812 (parasitic coil), which can be wound to have any suitable number of turns. For example, the coil 812 is shown to have three turns. In various embodiments, the secondary resonator 802 may be disposed on a substrate 82 to support the secondary resonator. The secondary resonator 802 may serve as an illustrative example of a means for coupling with a primary magnetic field, which for example may be generated by primary resonator 702. Accordingly, the substrate 82 may serve as an illustrative example of a means for supporting the means for coupling, namely the secondary resonator 802.

In various embodiments, the secondary resonator 802 may be a closed loop. In other words, the secondary resonator is not connected to a power source. The secondary resonator 802 may include an electrical connection 814 between the ends of the coil 812 to close the loop. In some embodiments, the electrical connection 814 may be made on the same side of the substrate that supports the coil 812. In other embodiments, the electrical connection 814 may be made on the opposite side of the supporting substrate; e.g., using conductive vias.

In accordance with the present disclosure, the primary and secondary resonators may be designed to have the same resonant frequency. In some use cases, this may be preferable in order to maximize mutual coupling between the resonators. Accordingly, as shown in FIG. 8B, in some embodiments, a secondary resonator 804 may comprise a capacitor 816 connected in series with the coil 812. In general, the capacitor 816 may be replaced by any suitable reactive component or circuit.

The capacitor 816 may be connected anywhere along the structure of the resonator. In some embodiments, for example, the capacitor 816 may be attached in-line with the electrical connection 814. In other embodiments, the capacitor 816 may be attached somewhere along the coil 812 itself. In still other embodiments, multiple capacitors in series or parallel may be placed in different locations and achieve the same objective.

The capacitance of capacitor 816 may be selected in order to set a resonant frequency of the secondary resonator 802 to a desired frequency; e.g., the resonant frequency of the primary resonator. The following relationship may be used to provide an estimate for the capacitance:

$$C = \frac{1}{L(2\pi f)^2},$$

where C is the capacitance,

L is the self-inductance of the coil, f is a resonant frequency; e.g., resonant frequency of the primary resonator.

In some embodiments, the primary resonator 702 may also include a series-connected capacitor (e.g., 932 in FIG. 9B), for example, so that a convenient value for resonant frequency can be selected to simplify the design.

Figure 9A:
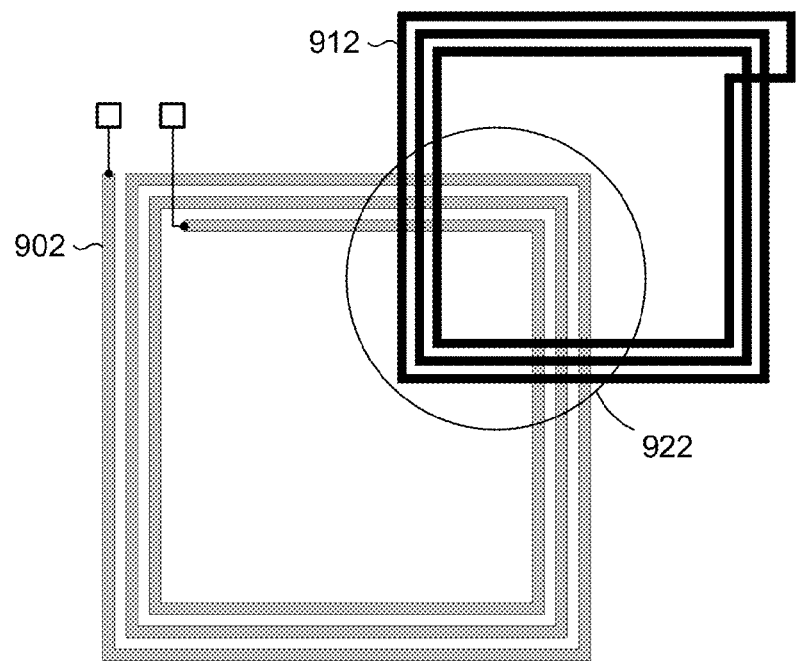
FIGS. 9A and 9B illustrate examples of stacking in accordance with the present disclosure.
Figure 9B:
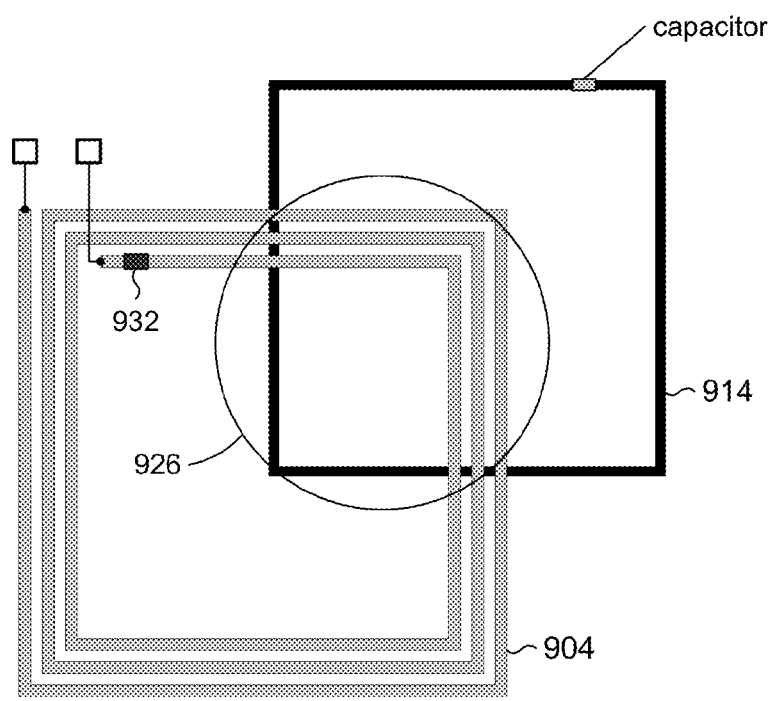

The following discussion will provide a description of examples of resonator designs and arrangements of resonators in accordance with various embodiments of the present disclosure. FIGS. 9A and 9B illustrate overlap configurations of resonators in accordance with the present disclosure.

FIG. 9A illustrates a configuration of a primary resonator 902 and a secondary resonator 912 in accordance with the present disclosure. Portions of primary resonator 902 and portions of secondary resonator 912 are in overlapping relation in region 922. In the particular embodiment shown in FIG. 9A, portions of secondary resonator 912 extend over (overlap) portions of primary resonator 902.

FIG. 9B illustrates another configuration of resonators 904, 914. In this embodiment, the primary resonator 904 is in overlapping relation with the secondary resonator 914 at region 926. In particular, FIG. 9B show portions of primary resonator 902 overlapping portions of secondary resonator 912.

FIG. 9B illustrates an example, vis-à-vis resonator 914, of a single turn loop. FIG. 9B further depicts an example of a capacitor 932 incorporated in primary resonator 904.

FIGS. 10A and 10B illustrate stacking configurations (stacking order) of resonators in accordance with the present disclosure. FIG. 10A depicts an example of vertical stacking in terms of a primary plane defined by a substrate for supporting a primary resonator and one or more secondary planes defined by substrates for supporting secondary resonators. In some embodiments, for example, each resonator (primary and secondary) may be encased in a housing, thus galvanically or otherwise electrically isolating one resonator from another; e.g., without a direct wired connection between such resonators. In other embodiments, two or more secondary resonators may be encased in a single housing or fabricated on different layers of a substrate, but otherwise electrically isolated from each other, and so on.

As illustrated in FIG. 10A, in accordance with the present disclosure, resonators may be disposed on planes that are generally parallel to each other, although non-parallel configurations may be useful for providing different shapes of the magnetic field, thus providing specific spatial configurations. The primary plane and secondary planes are shown staggered (e.g., in the direction of the X-axis) to emphasize that one or more of the secondary resonators may be in overlapping relation with the primary resonator. In some embodiments, the spacing S1, S2 between planes may be minimal; e.g., each substrate may be placed atop another substrate. The spacings S1, S2 between planes may be the same or different.

FIG. 10A depicts a stacking configuration in which the secondary planes are stacked above (e.g., in the Z-direction) the primary plane. In some embodiments, the secondary planes may be stacked below the primary planes. As shown in FIG. 10B, in other embodiments, the primary plane may be stacked between secondary planes.

The following discussion will provide descriptions of various illustrative configurations of resonators in accordance with the present disclosure. In order to simplify the figures, the following figures will depict the resonators schematically. It will be understood that in various embodiments, the resonators (primary and secondary) may comprise coils supported on suitable substrates. The coils may have one or more turns, and may include capacitors for tuning the resonant frequencies of the resonators.

Figure 11:
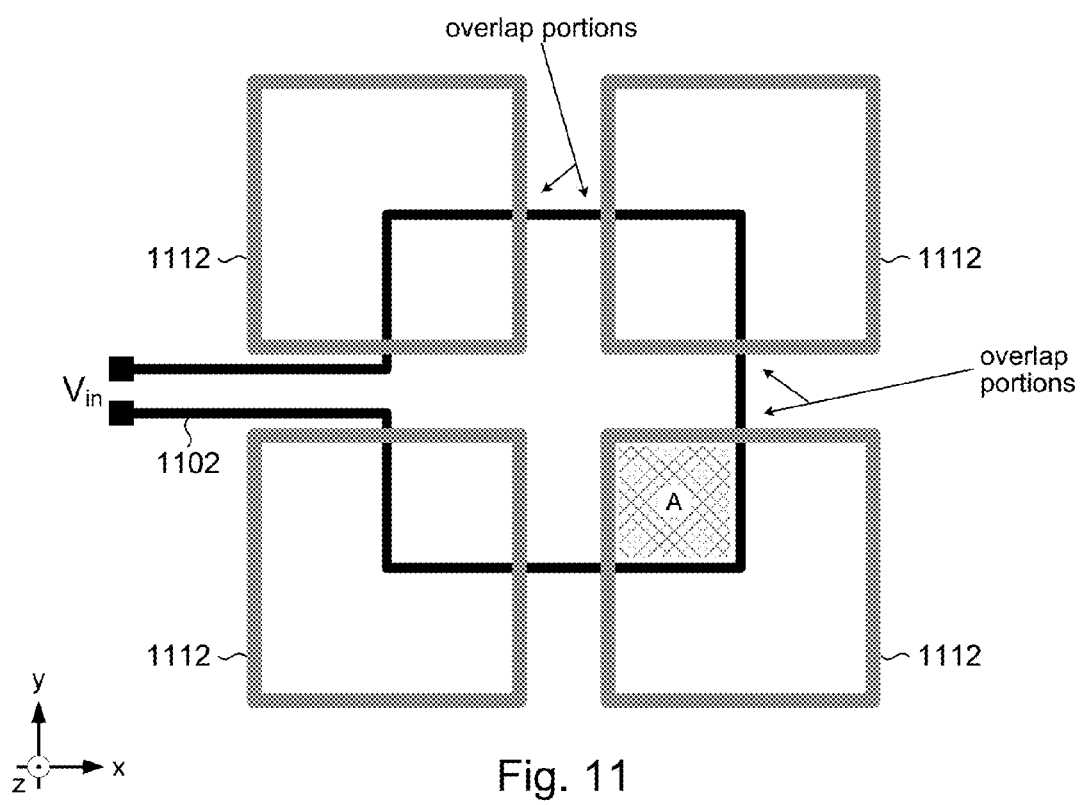
FIGS. 11, 12, 12A, 12B, 13, 13A, and 14 show illustrative examples of stacking configurations in accordance with the present disclosure.

FIG. 11 depicts an embodiment in accordance with the present disclosure. The configuration includes a primary resonator 1102. Several secondary resonators 1112 may be arranged about the primary resonator 1102. FIG. 11 shows the secondary resonators 1112 arranged generally symmetrically about the primary resonator 1102. Portions of the secondary resonators 1112 may extend over portions of the primary resonator 1102. The primary resonator 1102 may be the same or different size as the secondary resonators 1112. The sizes of the secondary resonators 1112 may be the same as each other, or may vary from one secondary resonator to another.

In some embodiments, the secondary resonators 1112 may be spaced apart vertically (e.g., Z-direction) relative to the primary resonator 1102 by the same distance. In other embodiments, the secondary resonators 1112 may be spaced apart vertically relative to the primary resonator 1102 by different distances. The secondary resonators 1112 may be positioned above the primary resonator 1102 (as depicted in FIG. 11), while in other embodiments the secondary resonators may be positioned below the primary resonator. In still other embodiments, the primary resonator 1102 may be positioned between the secondary resonators 1112.

In operation, an electromagnetic (EM) field is generated when a time-varying current flows through the primary resonator 1102. A primary EM field generated by the primary resonator 1102 induces current flows in the secondary resonators 1112 by virtue of mutual coupling between the primary resonator and the secondary resonators. Accordingly, current flowing in the secondary resonators 1112 can generate respective secondary EM fields that interact with and modify the primary EM field. A resultant EM field generally arises from the interaction of the primary and secondary EM fields. In some embodiments, for example, the primary and secondary EM fields may constructively combine to produce the resultant EM field. In other embodiments, the primary and secondary EM fields may destructively combine to produce the resultant EM field. In still other embodiments, the resultant EM field may arise from constructive and destructive combinations of the primary and secondary EM fields.

The vertical separations between the primary resonator 1102 and the secondary resonators 1112 can be adjusted to vary the interaction between the primary and secondary EM fields. Similarly, the degree of area overlap A between the primary resonator 1102 and a secondary resonator 1112 may be adjusted to vary interaction among the primary and secondary EM fields.

Figure 12:
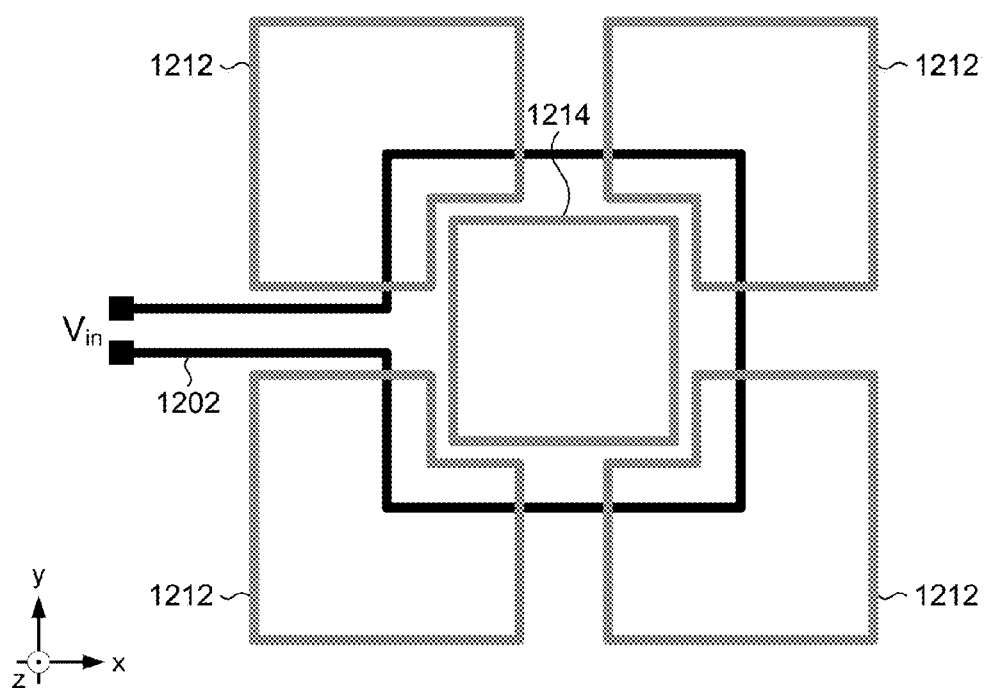

FIG. 12 depicts another embodiment in accordance with the present disclosure illustrating further aspects of the present disclosure. The configuration includes a primary resonator 1202, secondary resonators 1212, and an additional (tertiary) resonator 1214. The designation of "tertiary" has no significance other than to distinguish the tertiary resonator 1214 from the secondary resonators 1212. The sizes of the secondary resonators 1212 may be the same or may vary. Portions of the primary resonator 1202 and portions of the secondary resonators 1212 may overlap. In accordance with the embodiment shown in FIG. 12, the tertiary resonator 1214 may be disposed amongst the primary resonator 1202 and the secondary resonators 1212 without partially overlapping either the primary resonator or the secondary resonators.

In some embodiments, the secondary resonators 1212 may be spaced apart vertically relative to the primary resonator 1202 by the same distance. In other embodiments, the secondary resonators 1212 may be spaced apart vertically relative to the primary resonator 1202 at different distances.

The secondary resonators 1212 may be positioned above the primary resonator 1202 (as depicted in FIG. 12), while in other embodiments the secondary resonators may be positioned below the primary resonator. In still other embodiments, the primary resonator may be disposed between the secondary resonators. The tertiary resonator 1214 may have any suitable Z-axis location.

In operation, an electromagnetic (EM) field generated when a time-varying current flows through the primary resonator 1202 can induce current flows in the secondary resonators 1212 and the tertiary resonator 1214 by virtue of mutual coupling between the primary resonator and the secondary and tertiary resonators. Accordingly, current flowing in the secondary resonators 1212 and in the tertiary resonator 1214, in turn, can generate respective EM fields that interact with and modify the EM field generated by the primary resonator 1202. A resultant EM field generally arises from interactions between the EM fields generated by the resonators. In some embodiments, for example, the EM fields generated by the resonators can constructively combine to produce the resultant EM field. In other embodiments, the EM fields generated by the resonators can destructively combine to produce the resultant EM field. In still other embodiments, the resultant EM field may arise from constructive and destructive combinations of the EM fields generated by the resonators.

The vertical separations between the primary resonator 1202, the secondary resonators 1212, and the tertiary resonator 1214 can be adjusted to vary how the EM fields interact. Similarly, the amount of overlap between the primary resonator 1202 and a secondary resonator 1212 may be adjusted to vary the interaction.

Figure 12A:
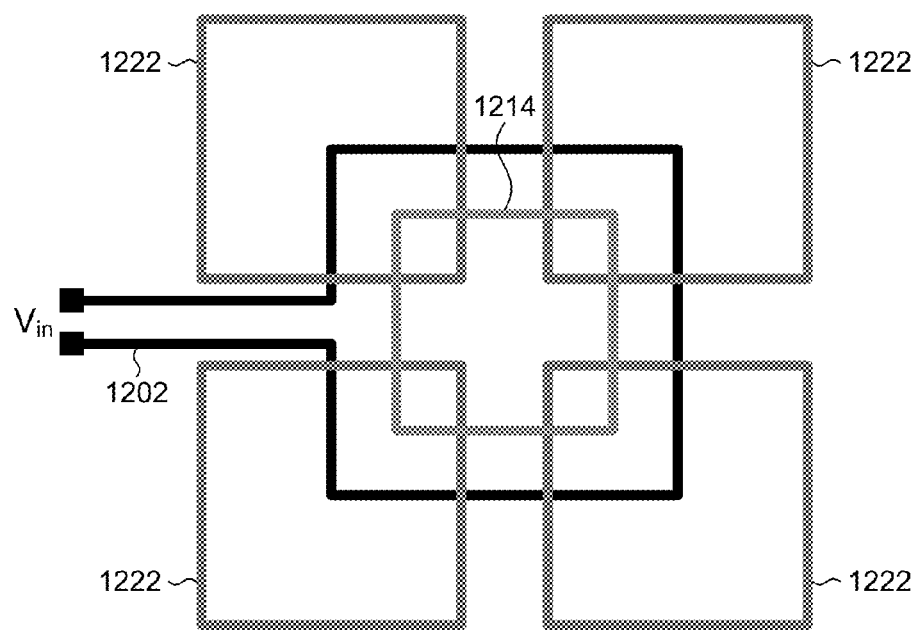

Referring to FIG. 12A, an alternative to the configuration shown in FIG. 12 may comprise secondary resonators 1222 in overlapping relation with tertiary resonator 1214. In this configuration, portions of the tertiary resonator 1214 overlap with portions of the secondary resonators but the tertiary resonator 1214 does not partially overlap with the primary resonator 1202.

Figure 12B:
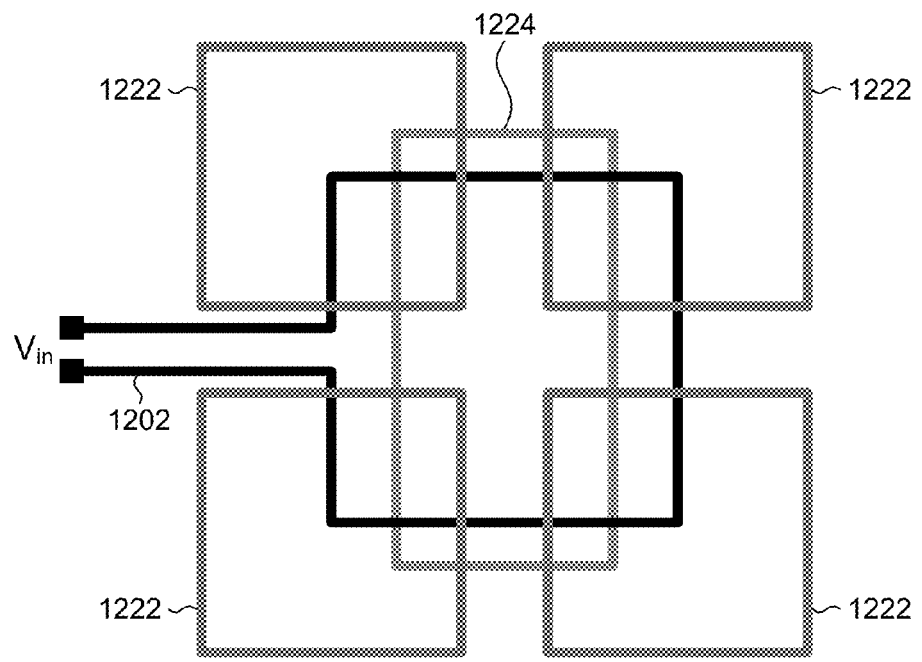

Referring to FIG. 12B, yet another alternative to the configuration shown in FIG. 12 may comprise a tertiary resonator 1224. In this illustrative embodiment, portions of the tertiary resonator 1224 overlap with portions of the primary resonator 1202 and portions of the secondary resonators 1212.

It can be appreciated from the foregoing that other configurations in accordance with the present disclosure are contemplated. In some embodiments, for example, additional secondary resonators may be provided to interact with or otherwise manipulate the EM field generated by the primary resonator; e.g., to extend or reduce an area (e.g., charging area) covered by the resultant EM field, to extend or reduce the vertical (Z-axis) extent of the resultant EM field, to increase the uniformity of the field strength, to reduce or otherwise limit EMI/RF exposure, and so on. The secondary resonators may be of different sizes. One or more of the secondary resonators may be arranged in overlapping relation with the primary resonator, and in varying amounts of overlap. The secondary resonators may be arranged in overlapping relation with one or more other secondary resonators. The vertical separation between the primary resonator and the secondary resonators may vary. The stacking order of the primary and secondary resonators may vary, and so on.

Figure 13:
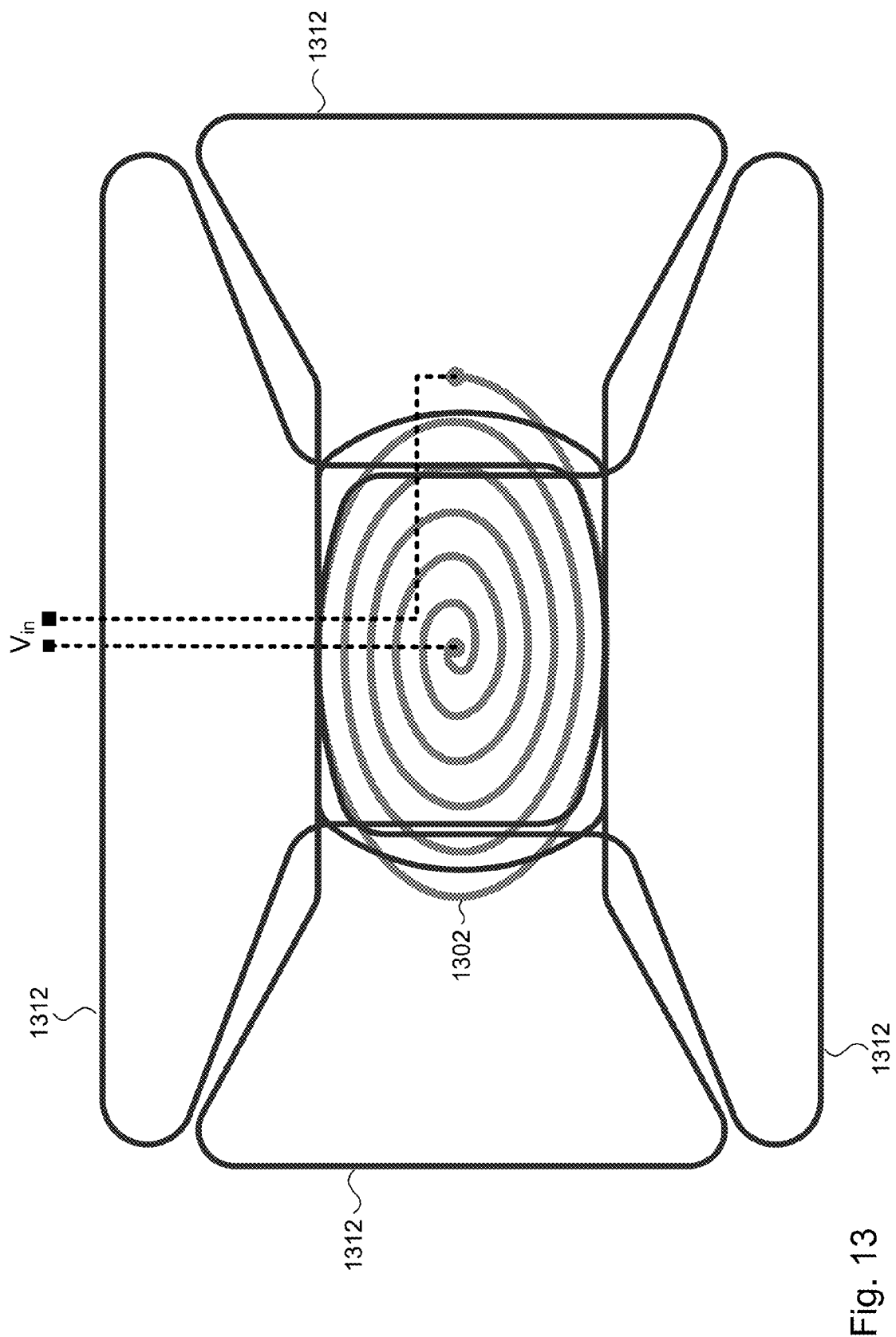
Figure 13A:
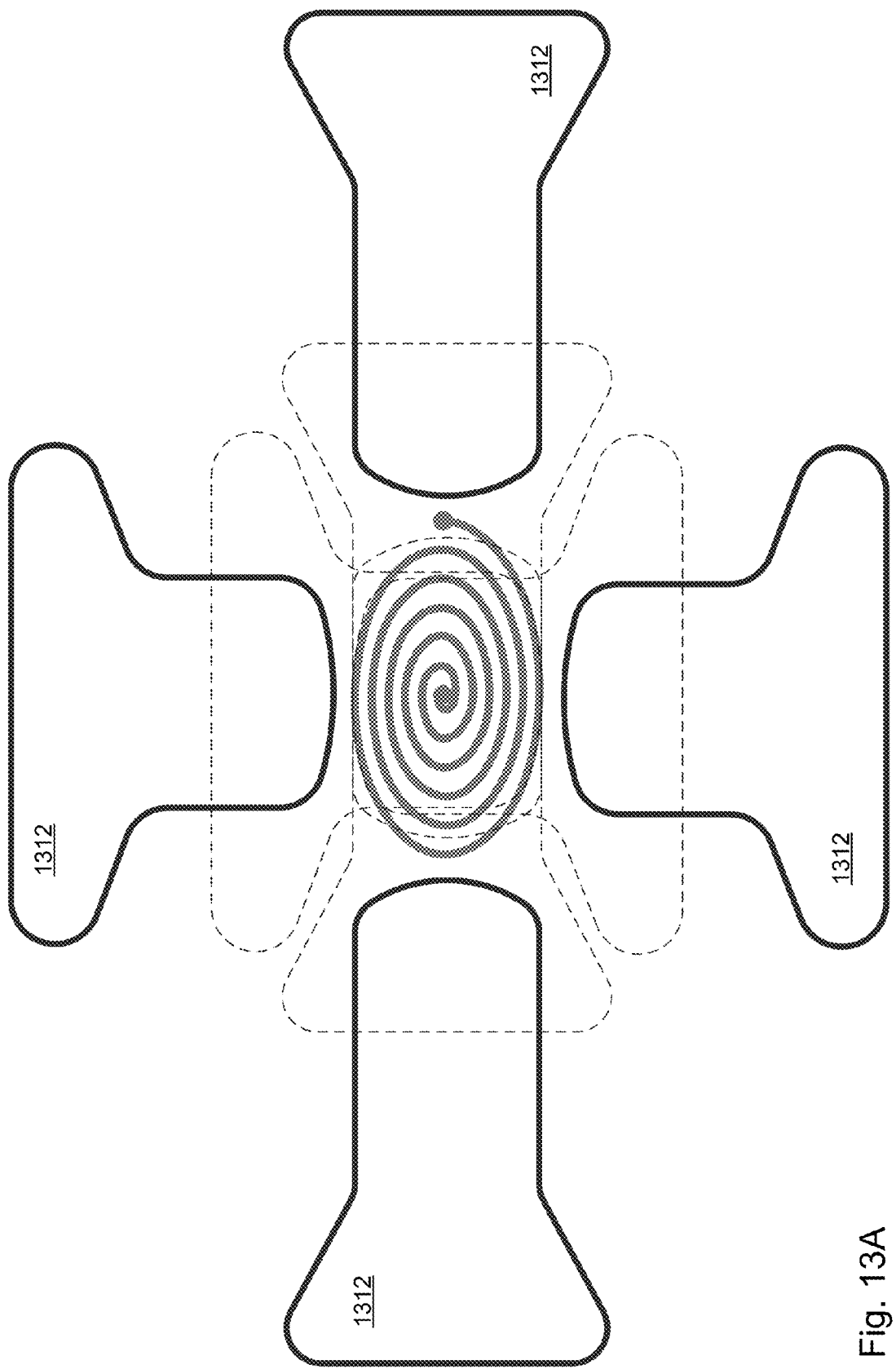

FIG. 13 depicts yet another embodiment in accordance with the present disclosure and provides still further aspects of the present disclosure. The foregoing illustrative embodiments depict the primary resonator and secondary resonators as having a generally rectilinear shape. In general, the resonators may have any suitable arbitrary shape. FIG. 13, for example, shows a configuration comprising an oval-shaped primary resonator 1302. The secondary resonators 1312 have arbitrary shapes, which can be seen more clearly in the exploded view in FIG. 13A.

Each of the secondary resonators 1312 overlaps much of the primary resonator 1302. In this configuration, the EM field generated in the center of this configuration of resonators by the primary resonator 1302 can induce a current in the secondary resonators 1312. The resultant EM fields generated in the secondary resonators 1312 can interact with the EM field generated by the primary resonator 1302 to produce a resultant EM field, as explained above for example.

Figure 14:
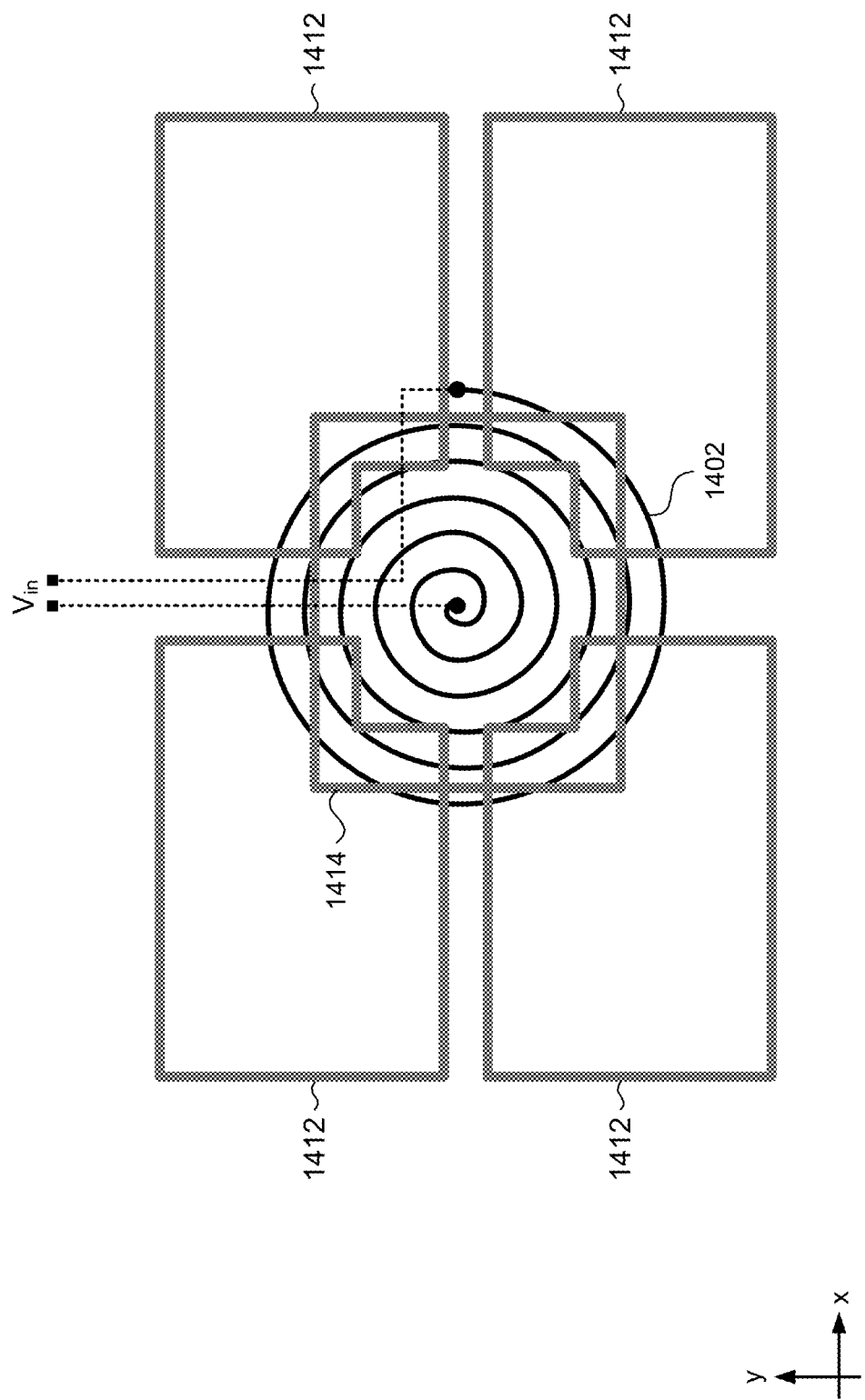

FIG. 14 depicts still another embodiment in accordance with the present disclosure. The configuration is similar to the configuration shown in FIG. 12B, and may comprise a primary resonator 1402 in overlapping relation with secondary resonators 1412 and tertiary resonator 1414. The tertiary resonator 1414 is in overlapping relation with all of the secondary resonators 1412. The stacking of the primary resonator 1402, secondary resonators 1412, and tertiary resonator 1414 can be in any order. In a particular embodiment, for example, the stack up may be, starting from the bottom, primary resonator 1402, tertiary resonator 1414, and secondary resonators 1412. In other embodiments, different stacking orders may be more suitable to achieve different EM field distributions and strengths.

An advantageous aspect of embodiments in accordance with the present disclosure is that a pre-existing wireless charging system need not be re-designed or otherwise modified. An existing wireless charging system can be adapted (patched out) to alter the charging configuration (e.g., area, EM field distribution, etc.) generated by the existing wireless charging system. For example, the resonator in a pre-existing wireless charging system may serve the role of primary resonator. Secondary resonators may then be stacked with the primary resonator to achieve a desired EM field configuration; e.g., increased or decreased the charging area, reduced EMI/RF interference, and so on. This may be desirable for the end-user because they can use their pre-existing wireless charging system without having to purchase and install an entirely new system. This may be desirable for manufacturers of wireless charging systems. They would not have to redesign their existing products, but instead can simply add one or more secondary resonators to their systems.

As an additional benefit to the above described configurations, it can be understood by anyone skilled in the art that each individual secondary and/or tertiary coil may be statically or dynamically coupled (i.e., energized) by various means (e.g., switches in the circuit or changes in the value of resistive and/or reactive components, which would cause de-tuning of the circuit, thus effectively de-coupling the resonators and preventing the transfer of energy).

It is further noted that, in order to preserve the correct field intensity in the charge area when changing the configuration of the system, the current in the primary resonator may have to be adjusted accordingly.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. An apparatus operative with a primary resonator substantially disposed on a first plane, said primary resonator coupled to a power source, said apparatus comprising:
    at least one secondary resonator substantially disposed on a second plane and coextensive with at least a portion of said primary resonator,
    at least one tertiary resonator disposed on a third plane, wherein the first plane, the second plane, and the third plane are different from one another,
    said at least one secondary resonator and said at least one tertiary resonator being parasitic coils that are galvanically isolated from said primary resonator,
    said at least one secondary resonator configured to generate a secondary magnetic field when coupled with a primary magnetic field generated by said primary resonator,
    said at least one tertiary resonator configured to generate a tertiary magnetic field when coupled with said primary magnetic field generated by said primary resonator, wherein a resultant magnetic field arises from interactions between said primary, secondary and tertiary magnetic fields.

2. The apparatus of claim 1, wherein said at least one secondary resonator and said at least one tertiary resonator have a configuration and an arrangement relative to said primary resonator so that said resultant magnetic field has a field distribution more uniform than a magnetic field produced by said primary resonator alone.

3. The apparatus of claim 1, wherein said at least one secondary resonator and said at least one tertiary resonator have a configuration and an arrangement relative to said primary resonator so that said resultant magnetic field has a field distribution that is different in extent in comparison to a magnetic field produced by said primary resonator alone.

4. The apparatus of claim 1, wherein said at least one secondary resonator and said at least one tertiary resonator have a configuration and an arrangement relative to said primary resonator so that said resultant magnetic field has a field distribution having a maximum height different from that of a magnetic field produced by said primary resonator alone.

5. The apparatus of claim 1, wherein said at least one secondary resonator extends over at most only a portion of said primary resonator.

6. The apparatus of claim 1, wherein said primary resonator and said at least one secondary resonator define a periphery larger than a periphery of said primary resonator alone.

7. The apparatus of claim 1, wherein said tertiary resonator does not overlap with said primary resonator.

8. The apparatus of claim 1, wherein said tertiary resonator does not overlap with said at least one secondary resonator.

9. The apparatus of claim 1, wherein said primary resonator is disposed on a primary substrate, said at least one secondary resonator is disposed on a secondary substrate, said at least one tertiary resonator is disposed on a tertiary substrate, said primary substrate being disposed below said secondary substrate and said tertiary substrate.

10. The apparatus of claim 1, wherein said tertiary resonator is in an overlapping relation with said primary resonator and said at least one secondary resonator.

11. The apparatus of claim 1, wherein said at least one secondary resonator includes a capacitive element connected in series therewith.

12. The apparatus of claim 11, wherein said capacitive element is sized so that a resonant frequency said at least one secondary resonator is substantially the same as a resonant frequency of said primary resonator.

13. The apparatus of claim 11, wherein said capacitive element is sized so that a mutual coupling between said primary resonator and said at least one secondary resonator is substantially maximal.

14. A method of generating a magnetic field comprising:
coupling with a primary magnetic field generated by a primary resonator; and
generating a secondary magnetic field from coupling with said primary magnetic field by aligning a secondary resonator in overlapping relation with said primary resonator,
generating a tertiary magnetic field from coupling with said primary magnetic field by aligning a tertiary resonator in an overlapping relation with said primary resonator,
wherein said secondary resonator and said tertiary resonator are parasitic loops each disposed on different planes and an interaction between said primary magnetic field, said secondary magnetic field, and said tertiary magnetic field producing a resultant magnetic field having a field distribution different from said primary magnetic field.

15. The method of claim 14, wherein said field distribution of said resultant magnetic field is more uniform than a field distribution of said primary magnetic field alone.

16. The method of claim 14, wherein said field distribution of said resultant magnetic field is different in extent as compared to a field distribution of said primary magnetic field alone.

17. The method of claim 14, wherein said field distribution of said resultant magnetic field has a different maximum height as compared to a field distribution of said primary magnetic field alone.

18. The method of claim 14, wherein said secondary resonator overlaps at most only a portion of said primary resonator.

19. The method of claim 14, further comprising aligning said secondary resonator relative to said primary resonator so that a periphery defined by said primary and secondary resonators is larger than a periphery of said primary resonator alone.

20. The method of claim 14, wherein said tertiary resonator does not overlap with said primary resonator.

21. The method of claim 14, setting a resonant frequency of said secondary resonator substantially equal to a resonant frequency of said primary resonator.

22. An apparatus for generating a magnetic field comprising:
means for parasitically coupling with a primary magnetic field generated by a primary resonator, said means for parasitically coupling configured to generate a secondary magnetic field and a tertiary magnetic field from being coupled with said primary magnetic field, said means parasitically for coupling coextensive with said primary resonator such that interaction between said primary magnetic field, said secondary magnetic field, and said tertiary magnetic field produces a resultant magnetic field having a field distribution different from said primary magnetic field; and
means for supporting said means for parasitically coupling relative to said primary magnetic field.

23. The apparatus of claim 22, wherein said field distribution of said resultant magnetic field is more uniform than a field distribution of said primary magnetic field alone.

24. The apparatus of claim 22, wherein said field distribution of said resultant magnetic field is different in extent as compared to a field distribution of said primary magnetic field alone.

25. The apparatus of claim 22, wherein said field distribution of said resultant magnetic field has a different maximum height as compared to a field distribution of said primary magnetic field alone.

26. The apparatus of claim 22, wherein said means for parasitically coupling extends over at most only a portion of said primary resonator.

27. The apparatus of claim 22, wherein said primary resonator and said means for coupling define a periphery larger than a periphery of said primary resonator alone.

* * * * *